United States Patent Office 3,493,096
Patented Feb. 3, 1970

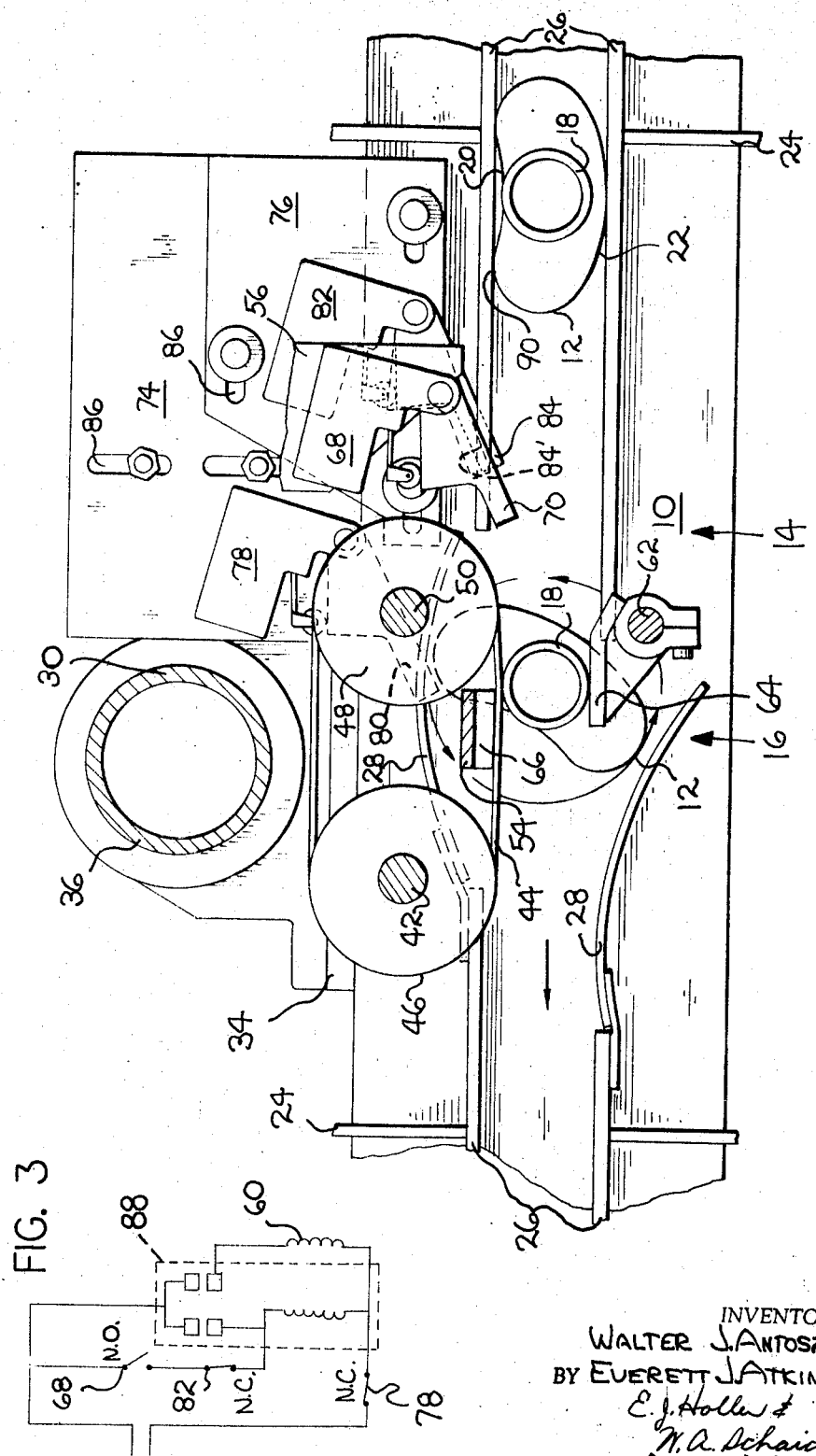

3,493,096
CONTAINER ORIENTING APPARATUS
Walter J. Antoszewski and Everett J. Atkinson, Toledo, Ohio, assignors to Owens-Illinois, Inc., a corporation of Ohio
Filed Jan. 25, 1968, Ser. No. 700,400
Int. Cl. B65g *47/24*
U.S. Cl. 198—33                                12 Claims

ABSTRACT OF THE DISCLOSURE

Apparatus for sequentially arranging containers such as flasks on a translating conveyor belt so that either their concave or convex panels will all face in the identical direction, the apparatus including: sensing fingers for detecting the orientation of successive flask panels, a continuous belt for rotating selective flasks, a solenoid operated gate for bringing improperly oriented flasks into engagement with the continuous belt and means which respond to the operation of the sensing fingers for energizing the solenoid operated gate.

BACKGROUND OF THE INVENTION

This invention generally relates to the art of arranging articles on a conveyor; more particularly, it relates to apparatus for automatically orienting the panel portions of a series of flasks as they are in transit along a belt conveyor.

In the manufacture of glass containers, freshly formed containers are first subjected to an annealing cycle and are subsequently conveyed to an inspection station, the acceptable ware then being transported to an off-bearing area where it is packed for shipment. When manufacturing non-symmetric containers such as, for example, flasks having opposed concave and convex panels it is highly desirable, for purposes of efficiency of the overall manufacturing system, to supply these containers to the inspection equipment and the off-bearing area in such fashion that similar panels on adjacent containers are oriented in the identical direction. In the past, improperly oriented containers have been reoriented manually.

Thus, it is the general object of this invention to provide a reliable and durable apparatus, of simplified construction, for properly orienting similarly shaped panels on adjacent flasks, the apparatus being automatically operated by the movement of the flasks themselves.

SUMMARY OF THE INVENTION

A preferred embodiment of this invention as herein shown and described includes a continuously traveling conveyor-belt by which containers having dissimilar opposed panels are carried singly and in succession through a detecting zone and into a container orienting zone. During passage through the detecting zone, a flask is selectively engaged by two mechanical fingers, each of which operates one of two series-wired switches and serve to detect and to prescribe those containers having an improper orientation. The orienting zone includes a continuous belt which, upon engaging a container, will transmit rotational movement to the container. Disposed opposite the belt in the orientation zone is a pivotal arm which is solenoid operated; this arm serves to direct improperly oriented containers into rotational engagement with the belt whereby they are properly reoriented. Should an improperly oriented container be detected by the fingers, the switches will actuate a relay and this relay will, in turn, energize the solenoid and cause the pivotal arm to be brought to a closed position. This closed position then directs the container into engagement with the belt for reorientation, the arm then being returned to an open position by means of a suitably positioned reset switch which de-energizes the circuit. Contrariwise, should a properly oriented container be brought into the detection zone, the fingers and their appendant switches operate in a disabling fashion and preclude closing of the pivotal arm. Hence, the containers pass through the orienting zone without engaging the continuous belt.

BRIEF DESCRIPTION OF THE DRAWINGS

The foregoing and other advantageous features of this invention will be more apparent by reference to the drawings, of which:

FIG. 2 is a plan view of the embodiment of FIG. 1;

FIG. 3 is a schematic electrical diagram for automatically operating the apparatus shown in FIGS. 1 and 2.

DESCRIPTION OF THE PREFERRED EMBODIMENT(S)

Figure 1:
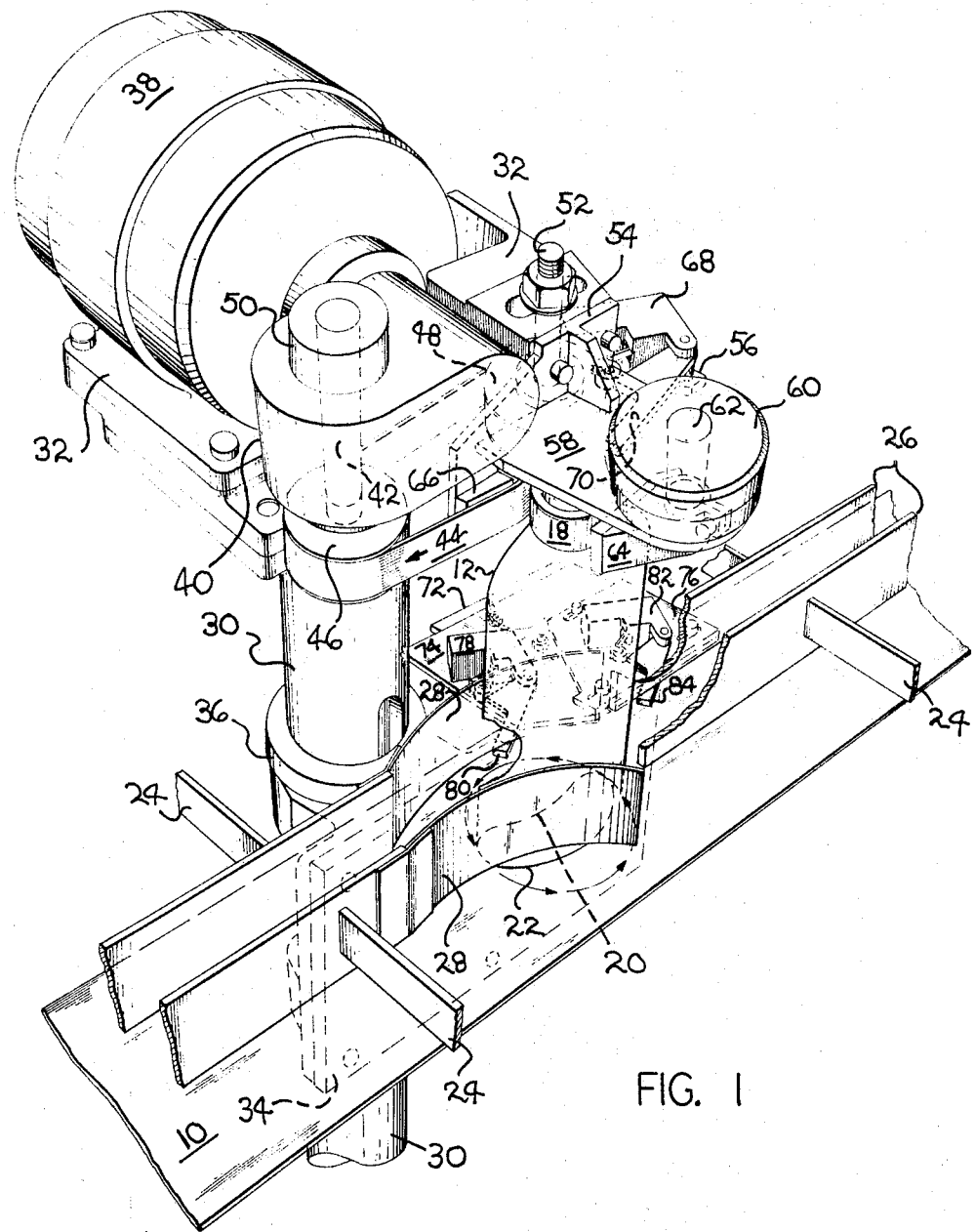
FIG. 1 is a perspective view of a preferred embodiment of this invention.

Referring to the drawings, there is shown a segment of a conveyor of the type having a traveling conveyor belt 10, the belt moving from right to left as shown and transporting a tandem array of vertically upright containers 12, having dissimilar opposed panels, through a detection zone 14 into a container orienting zone or position 16. Preferably, the containers are aligned in such fashion that the longitudinal axis of a container transverse section is parallel to the direction of travel of belt 10. The containers with which this invention is particularly concerned are those commonly referred to in the art as flasks, the flasks including a vertically disposed neck 18 and opposed panels whose central sections define a concave surface 20 and a convex surface 22. Disposed upwardly of conveyor belt 10, and supported by members 24, are a pair of opposed parallel rails 26 for singly and successively guiding the respective containers, to and from orienting zone 16. In orienting zone 16, parallel rails 26 are temporarily discontinued and opposed slightly diverging arcuate panels or rails 28 are mounted therein. As will be seen shortly, arcuate panels 28 serve to guide the rotation of those containers which are to be reoriented in zone 16.

Positioned adjacent the conveyor is a generally tubularly-shaped support element 30 to which is affixed, at its upper margin, a generally horizontal disposed plate assembly 32. Support element 30, in the preferred embodiment, includes a vertically disposed panel 34 which is bolted to the conveyor side panels (not shown) downwardly of belt 10, thus providing additional stabilizing support for element 30. As shown, panel 34 may be mounted to element 30 by means of a suitable collar assembly 36, the latter being either welded or set-screwed to element 30.

Mounted to plate assembly 32 is a motor 38 driving a suitable gear mechanism 40 both of which in turn indirectly drive a continuous belt 44. Belt 44 is supported by a driving roll 46 and an idler roll 48. In the preferred embodiment, the belt extends into orienting zone 16, upwardly of arcuate rails 28, and includes an outer vertical surface which is generally aligned parallel with the inner surface of the respectively opposed container guide rails 26. Moreover, as this belt functions to rotate improperly oriented containers, it is most preferred that it be in horizontal alignment with the respective container necks 18, but yet sufficiently displaced therefrom to preclude neck engagement in and of itself. Driving roll 46 which supports belt 44 is stationarily affixed to the lower margin of shaft 42, the latter being rotatable within bearing 50 and extending through and being rotatably driven by gear mechanism 40. Idler roll 48 supplements the belt support provided by roll 46 and is rotatably coupled to a stud 52 mounted in assembly 32.

Also mounted to plate assembly 32 are two brackets, 54 and 56 respectively. Bracket 54 is supported on a front face of assembly 32 and includes an outwardly projecting panel 58 which transversely spans the path of the transported containers defined by guide rails 26 and is disposed above such transported containers. The outer margin of bracket 54 supports a "rotary-type" solenoid 60 whose shaft 62 extends beneath panel 58 and supports a pivotal arm or gate 64. This gate member is disposed opposite belt 44 and the like the latter is in horizontal registry with container necks 18. Thus, in its closed position, as shown in FIG. 2, the distance between gate 64 and belt 44 is less than the diameter of the respective container necks 18, hence causing the necks to become rotatably engaged by the belt 44. Contrariwise, when in its open position the containers are free to pass through the orienting zone without belt engagement. To insure proper engagement between belt 44 and container necks 18, bracket 54 may be provided with a biasing member 66, which bears outwardly upon belt 44 and serves to maintain its proper alignment.

Bracket 56 is mounted sidewise of assembly 32 and supports a normally-open switch 68 disposed upstream of belt 44. Switch 68 is operative to a closed position by an integral, pivotal finger 70 which extends into the path of the containers transported along conveyor 10 and is adapted to engage each container neck as it passes detection zone 14.

Mounted to the vertically disposed panel 34, upstream of belt 44, is a horizontal platform 72 which as shown in FIG. 1 provides support for two switch-bearing panels, 74 nad 76 respectively. Panel 74 has a normally-closed reset switch 78 mounted thereon which is operative to an open position by finger 80. Switch 88 is positioned on panel 74 in such fashion that finger 80 projects into the path which is defined by those containers that, as will subsequently be described, are rotated and reoriented in zone 16. As shown in the drawings, finger 80 is disposed beneath arcuate panels 28 and will be engaged by a rotating container after it has revolved about one-quarter of a revolution. Panel 76 includes a normally-closed switch 82 operative to an open position by a panel-sensing finger 84 which extends into the path of the containers beneath rail 26. If desired, panels 74 and 76 respectively, may be provided with elongated slots 86 allowing adjustment thereof.

In positioning finger 70 and finger 84 in the path of the moving containers 12 it is important that they are maintained in a prescribed relationship. Finger 84 primarily detects the curvature of the adjacent container panels and thereby prescribes those containers, or flasks, which are properly or improperly oriented. This detection primarily transpires in the time interval that finger 84 is disposed outwardly of the central section of the respective container panels. Thus, as shown in FIG. 1 where the flask is translated along conveyor 10 with its concave panel facing inwardly, finger 84 is so positioned that it will float in the centrally located recess and will not engage the panel in this area. On the other hand, when the flasks are so oriented that their convex panels face inwardly, finger 84 should also be suitably positioned in such fashion that it will now engage the central bulging portion of the flask hence opening normally-closed switch 82. Finger 70 on the other hand is so positioned in the container path that it will contact each container during the time interval in which finger 84 is disposed outwardly of the central panel section, irregardless of the container orientation. In the preferred embodiment, this latter contact is accomplished by suitably positioning finger 70 in the path of the respective necks 18.

As shown in the schematic diagram of FIG. 3, switches 68 and 82 are wired in series and a conventional relay which is generally designated 88 and shown by the dotted box, is wired in parallel circuitry therewith. Relay 88 thus operatively responds to the simultaneous closing of switches 68 and 82 and will then energize solenoid 60. When reset switch 78 is opened, the solenoid is de-energized and the entire circuit is reset to its initial operating mode.

For purposes of describing the operation of the above apparatus, the flasks shown in the drawings are hypothesized to be improperly oriented, i.e. as a series of flasks are supplied to guide rails 26, those having their concave panel 20 facing inwardly will be considered improperly oriented and those having their convex panel facing inwardly will be termed properly oriented. Thus, as the tandem array of containers leave orientation zone 16, all of their convex panels 22 will be faced inwardly and all concave panels 20 will be oriented outwardly.

As noted supra, switch 68 is normally-open and therefore, the circuit is normally "dead" with pivotal gate 64 being in an opened position. Because neck switch 68 and panel-sensing switch 82 are wired in series the entire circuitry will become operative only when both switches are concurrently closed. When a properly oriented container or flask is transported along belt 10 to detection zone 14 the circuitry will not become operative and container 12 will pass into and through orientation zone 16 without being rotated or re-oriented. The inoperativeness of the circuit is the result of the disabling action of the finger 84; that is, in the time during which finger 84 is disposed proximately outwardly of the central panel section finger 72 contacts neck 18 and thereby closes normally-opened switch 68; however, since finger 84 will contact the convex panel section during its central disposition it is forced inwardly to position 84' in FIG. 2 and thus open normally-closed switch 82. Hence, with a properly oriented flask the interrelationship of fingers 70 and 84, and therefore switches 68 and 82, are effectively reversed with respect to their "dead" positions but accomplish the same result, i.e. pivotal gate 64 is not closed and the flasks are free to pass through orienting zone 16 without rotatably engaging the continuously driven belt 44.

Conversely, when an improperly oriented flask passes detection zone 14 there is a time interval wherein switches 68 and 82 will concurrently be in a closed position and pivotal gate 64 will therefore be actuated to its closed position, causing the flask to be biased against belt 44 for reorientation. This operation is best understood by reference to FIGS. 2 and 3 wherein an improperly oriented flask is shown just prior to its entrance into detection zone 14 and another flask is shown in revolving relation with belt 44. Thus, as the upstream flask traverses the path defined by rails 26, finger 84 initially contacts the bulging portion 90 of the panel having a concave central section 20. Since finger 70 has not, during this contact yet been engaged by neck 18 it remains opened and the circuit remains "dead." Upon a further lineal increment of movement of flask 12 however, finger 70 engages neck 18 thereby closing normally-opened switch 68 and finger 84 non-contactingly floats in the recess of concave section 20. Accordingly, during this time interval both switch 68 and switch 82 are closed and relay 88, in response to the switch closing, will itself close and thereby energize solenoid 60. The energization of solenoid 60 causes pivotal gate 64 to be brought to its closed position and as the detected flask enters orientation zone 16 it is biased into engagement with continuous belt 44. The latter is generally traveling in the same direction as conveyor belt 10 but has a translating speed approximately double that of the conveyor belt and will therefore transmit a force onto the flask which results in a counterclockwise rotation of an improperly oriented flask. After a flask has turned approximately 90° its momentum, and the additional rotation directing motion furnished by the interaction of arcuate guide members 28 and conveyor belt 10, allows the flask to rotate approximately another 90° whereby it will become properly oriented and will be conveyed from zone 16 along belt 10. At a point where the rotating flask has been displaced approximately 90° finger 80, which operates normally-closed reset switch 78, is so positioned to engage the flask and cause switch 78 to open. This opening then precludes current continuity in the electrical circuit and causes the entire system to be reset with pivotal gate 64 being retracted to its original open position.

From the foregoing it is deemed apparent that, to ensure proper operation, successive flasks should be sufficiently displaced along conveyor 10 to preclude the possibility of there being more than one flask in the region disposed intermediate finger 84 and reset-finger 80. Otherwise, a properly oriented container may be re-oriented to an improper position because of a subsequent, improperly oriented container having had activated the circuit by engaging fingers 70 and 84.

While a preferred embodiment of this invention has been described in detail above it is, of course, apparent that modification is possible. Consequently, the foregoing is to be considered exemplary, rather than limiting.

We claim:

1. Apparatus for orienting containers having dissimilar side panels comprising: a traveling conveyor for transporting said containers singly and in succession and in a vertically upright position to an orienting position, container engaging means disposed above said conveyor at said orienting position for rotating improperly oriented vertically upright containers on said conveyor, first means disposed upstream of said container engaging means and positioned in the path of said transported containers for detecting the orientation of said side panels of said vertically upright containers, and second means responsive to said first means for bringing improperly oriented vertically upright containers into rotational engagement with said container engaging means.

2. The apparatus of claim 1, wherein said container engaging means comprises a continuous belt and means for supporting and driving said belt.

3. The apparatus of claim 1, and further including opposed arcuate rails at said orienting position, said rails being disposed intermediate said conveyor and said container engaging means for guiding the rotating motion of said vertically upright containers which are improperly oriented.

4. The apparatus of claim 1, wherein said second means comprises a pivoting member disposed opposite said container engaging means, a solenoid element supporting and operating said pivoting member and electrical means for energizing said solenoid element.

5. The apparatus of claim 1, wherein said first means includes a finger exclusively engageable with the central section of one of said side panels and with non-central sections of another of said side panels.

6. The apparatus of claim 5, wherein said second means is responsive to the relationship of said finger and the central panel sections of the respective containers.

7. The apparatus of claim 6 and further including means upstream of said container engaging means for guiding said containers to said first means in such a manner that the longitudinal axis of a transverse sections of said containers is generally parallel to the direction of travel of said conveyor.

8. Apparatus for orienting containers having respectively opposed convex and concave panel portions, said apparatus comprising: a traveling conveyor belt supporting and successively transporting said containers to an orientation section, means upstream of said orientation section projecting into the path of said transported containers for detecting the panel orientation of said containers, container engaging means disposed upwardly of said conveyor at said orientation section for rotating improperly oriented containers, and electrical means responsive to said detecting means for actuating said container engaging means.

9. The apparatus of claim 8, wherein said means for detecting the panel orientation of said containers includes a first member centrally engageable with a convex panel but non-centrally engageable with a concave panel, and a second member contacting each of said containers when said first member is centrally disposed with respect to a container panel.

10. The apparatus of claim 9, wherein said electrical means for actuating said container engaging means is responsive to the relationship of said first member with respect to the central section of a container panel.

11. The apparatus of claim 10, wherein said electrical means includes a first switch operated by said first member, a second switch operated by said second member, and a relay, said first and second switches being wired in series and said relay being wired in parallel with said series-wired switches.

12. Apparatus for arranging flasks having opposed concave and convex panels so that identical panels face in the same direction, said apparatus comprising: a conveyor segment successively transporting a plurality of flasks in upright random arrangement to a flask orienting position; opposed arcuate members positioned proximately upwardly of said conveyor and defining said flask orienting position; rail means upstream of said opposed arcuate members for guiding said flasks to said orienting position in such fashion that the longitudinal axis of a transverse section of said flasks is generally parallel to the direction of travel of said conveyor; a continuous belt at least partially extending through said orienting position and means for driving and supporting said belt; a pivotal gate mounting opposite said belt and being selectively engageable with flasks having improperly oriented panels for bringing said flasks into engagement with said belt, said improperly oriented flasks thereby being rotated by said belt and guided by said arcuate members to a proper orientation; interdependent first and second fingers positioned in the path of said transported flasks defined by said rail means for prescribing improperly oriented flasks, said first finger being centrally engageable with a convex panel and non-centrally engageable with a concave panel, and said second finger being enagegeable with each flask in the time interval that said first finger is centrally disposed with respect to a flask panel, and means responsive to the flask-contaching relationship of said first and second fingers for actuating said pivotal gate, thereby selectively rotating improperly oriented flasks.

References Cited

UNITED STATES PATENTS 3,101,832   8/1963   Wylie _____ 198—33
3,381,827   5/1968   Dannhardt _____ 214—1

GERALD M. FORLENZA, Primary Examiner

G. F. ABRAHAM, Assistant Examiner

PO-1050
(5/69)

UNITED STATES PATENT OFFICE
CERTIFICATE OF CORRECTION

Patent No. 3,493,096      Dated February 3, 1970

Inventor(s) Walter J. Antoszewski and Everett J. Atkinson

It is certified that error appears in the above-identified patent and that said Letters Patent are hereby corrected as shown below:

Column 3, line 13, "the", first occurrence, should be cancelled. Column 3, line 35, "nad" should be - - and - - . Column 5, line 54, "the" should be - - a - - . Column 6, line 41, "mounting" should be - - mounted - - .

SIGNED AND
SEALED
JUL 7 1970

(SEAL)
Attest:

Edward M. Fletcher, Jr.
Attesting Officer            WILLIAM E. SCHUYLER, JR.
                                       Commissioner of Patents